US009221126B2

(12) United States Patent
Merz (10) Patent No.: US 9,221,126 B2
(45) Date of Patent: Dec. 29, 2015

(54) METHOD FOR PRODUCING A CELLULAR WHEEL

(75) Inventor: Karl Merz, Reinach (CH)

(73) Assignee: MEC Lasertec AG, Leimbach (CH)

( * ) Notice: Subject to any disclaimer, the term of this patent is extended or adjusted under 35 U.S.C. 154(b) by 271 days.

(21) Appl. No.: 13/882,319

(22) PCT Filed: Oct. 26, 2011

(86) PCT No.: PCT/EP2011/068713
§ 371 (c)(1),
(2), (4) Date: Apr. 29, 2013

(87) PCT Pub. No.: WO2012/059372
PCT Pub. Date: May 10, 2012

(65) Prior Publication Data
US 2013/0206734 A1 Aug. 15, 2013

(30) Foreign Application Priority Data
Nov. 3, 2010 (EP) .................................... 10189873

(51) Int. Cl.
*B23P 17/00* (2006.01)
*B23P 25/00* (2006.01)
*B23K 31/02* (2006.01)
(Continued)

(52) U.S. Cl.
CPC ................ *B23K 31/02* (2013.01); *B21C 37/22* (2013.01); *B21D 53/26* (2013.01); *F02B 33/42* (2013.01); *F04F 13/00* (2013.01); *B23K 2201/08* (2013.01); *Y10T 29/4981* (2015.01); *Y10T 29/49231* (2015.01); *Y10T 29/49234* (2015.01); *Y10T 29/49812* (2015.01); *Y10T 29/49989* (2015.01);
(Continued)

(58) Field of Classification Search
CPC .......... F02B 33/42; F04F 13/00; B21C 37/22; B21C 37/225; B23K 2201/08; Y10T 29/53113; Y10T 29/4998; Y10T 29/49989; Y10T 29/49995; Y10T 29/4981; Y10T 29/49812; Y10T 29/49378; Y10T 29/49384; Y10T 29/49231; Y10T 29/49234
See application file for complete search history.

(56) References Cited

U.S. PATENT DOCUMENTS 2,857,661 A * 10/1958 Bruegger ........................ 29/726
3,084,511 A *  4/1963 Klapproth .................... 60/39.45
(Continued)

FOREIGN PATENT DOCUMENTS

| DE | 937 407 C | 1/1956 |
|---|---|---|
| GB | 1 076 235 A | 7/1967 |
| WO | 2010/057319 A1 | 5/2010 |

OTHER PUBLICATIONS

International Search Report for PCT/EP2011/068713, dated Dec. 29, 2011.

*Primary Examiner* — Essama Omgba
(74) *Attorney, Agent, or Firm* — Sughrue Mion, PLLC (57) ABSTRACT

A method for producing a cellular wheel, wherein a tool having a cylindrical inner shell, the diameter of which corresponds to the inner diameter of the subsequent sleeve, is placed on the free end edges of the fins for fixing the angular orientation of the fins. A molding material mixture is applied in the cells bounded by the inner shell of the tool and the fins and cured. After removing the tool, the subsequent sleeve is placed on the free end edges of the fins fixed in place by the cured molding material mixture. The free end edges of the fins are joined to the subsequent sleeve to the cells. The cured molding material mixture is thermally treated and is removed from the cells.

14 Claims, 7 Drawing Sheets

(51) Int. Cl.
    *B21C 37/22* (2006.01)
    *B21D 53/26* (2006.01)
    *F02B 33/42* (2006.01)
    *F04F 13/00* (2009.01)

(52) U.S. Cl.
    CPC ...... *Y10T 29/49995* (2015.01); *Y10T 29/49998* (2015.01)

(56) References Cited

U.S. PATENT DOCUMENTS

| | | | | |
|---|---|---|---|---|
| 3,109,580 A | * | 11/1963 | Kentfield | 417/64 |
| 3,120,919 A | * | 2/1964 | Gardiner | 417/64 |
| 3,291,380 A | * | 12/1966 | Brown et al. | 417/64 |
| 3,409,579 A | | 11/1968 | Robins | |
| 3,458,116 A | * | 7/1969 | Wunsch et al. | 417/64 |
| 3,958,626 A | * | 5/1976 | Klein | 165/8 |
| 4,505,419 A | * | 3/1985 | Steeb | 228/183 |
| 4,744,213 A | * | 5/1988 | El-Nashar | 60/39.45 |
| 5,110,561 A | * | 5/1992 | Hitachi et al. | 422/180 |
| 6,460,342 B1 | * | 10/2002 | Nalim | 60/772 |
| 6,991,023 B2 | * | 1/2006 | Berchowitz et al. | 165/10 |
| 8,474,515 B2 | * | 7/2013 | Burgers et al. | 165/164 |
| 8,756,808 B2 | * | 6/2014 | Merz | 29/889.21 |
| 2011/0239463 A1 | * | 10/2011 | Merz | 29/894 |
| 2012/0057994 A1 | * | 3/2012 | Merz | 417/64 |
| 2013/0037008 A1 | * | 2/2013 | Takamiya | 123/559.2 |
| 2013/0206734 A1 | * | 8/2013 | Merz | 219/121.14 |
| 2013/0330200 A1 | * | 12/2013 | Merz | 416/223 R |

* cited by examiner

Fig. 13 ously with the high energy consumption by way of fossil
METHOD FOR PRODUCING A CELLULAR WHEEL

CROSS REFERENCE TO RELATED APPLICATIONS

This application is a National Stage of International Application No. PCT/EP2011/068713 filed Oct. 26, 2011, claiming priority based on European Patent Application No. 10 189 873.2, filed Nov. 3, 2010, the contents of all of which are incorporated herein by reference in their entirety.

TECHNICAL FIELD

The present invention relates to a method for producing a cellular wheel from metal, having sleeves which lie concentrically with respect to a rotational axis and fins which are arranged between sleeves which follow one another, are oriented radially with respect to the rotational axis, are joined with an end edge to a sleeve, and are fixed in their angular position before the joining of the free end edges to a following sleeve.

PRIOR ART

The method of downsizing has belonged for some years to the main topics in the construction of new, supercharged engines. The fuel consumption and therefore the exhaust gas emissions of a vehicle can be reduced by way of downsizing. These aims are becoming more and more important nowadays, since the high energy consumption by way of fossil fuels contributes greatly to air pollution and more and more strict legal measures are forcing the automotive producers to act. Downsizing is understood to be the substitution of a large-volume engine by an engine with a reduced engine displacement. Here, the engine power output is to be kept constant by supercharging of the engine. The aim is to achieve the same power output values with small-volume engines as with naturally aspirated engines of the same power output. New findings in the field of downsizing have shown that, in particular in the case of very small gasoline engines with an engine displacement of 1 liter or less, the best results can be achieved with pressure wave supercharging.

In the case of a pressure wave supercharger, the rotor is configured as a cellular wheel and is enclosed by an air and exhaust gas housing with a common shell. The development of modern pressure wave superchargers in order to supercharge small engines leads to cellular wheels with a diameter in the order of magnitude of 100 mm or less. In order to achieve a maximum cell volume and also for the purpose of weight reduction, cell wall thicknesses of 0.5 mm or less are aimed for. At the high exhaust gas entry temperatures of approximately 1000° C., in practice only highly heat-resistant steels and alloys are suitable as materials for the cellular wheel. The production of dimensionally stable and highly precise cellular wheels with a low cell wall thickness is scarcely possible today or else is associated with considerable additional costs.

It has already been proposed to form the chambers of a cellular wheel from Z-shaped profiles which are in a row next to one another and overlap partially. However, the production of a cellular wheel of this type is associated with high time outlay. In addition, placing Z-profiles next to one another in a row and fixing them in an accurate position can scarcely be carried out with a precision which is sufficient for maintaining the required tolerances.

It has also already been proposed to produce a cellular wheel from a solid body by eroding the individual cells. However, it is not possible by way of this method to achieve cellular wall thicknesses of less than 0.5 mm. A further substantial disadvantage of the eroding method is the associated, high material and machining costs.

A method of the type which is mentioned at the outset is disclosed in WO 2010/057319 A1. The fixing of the fins which project to the outside from a sleeve in a predefined angular position takes place via a tool with fingers which can be pushed on the end side in the axial direction between the fins, fill the intermediate space between adjacent fins, and in the process move the fins into the predefined angular position and fix them in the latter. After a next sleeve has been pushed on, it is welded by means of a laser beam to the free end edges of the fins which lie beneath it, by means of a bead on plate weld. Subsequently, the sleeve is fitted with further fins which are positioned one after another and are joined by means of a laser beam to the sleeve by means of a hollow seam, and, as described above, is fixed in a predefined angular position and is fitted with further fins. This operation is repeated in accordance with the construction of the cellular wheel to be produced until the final setting and joining of the outermost sleeve.

The fixing of the fins which project to the outside from a sleeve in a predefined angular position by way of a tool, by way of which, according to WO 2010/057319 A1, molding pieces are inserted between the fins, and which is associated with the disadvantage that said molding pieces can scarcely be removed any more from the fin intermediate spaces without damage of the joined parts. The reason lies in the fact that the locally high temperatures which occur during the welding lead to mechanical stresses and therefore to jamming of the molding parts and the fins.

SUMMARY OF THE INVENTION

The invention is based on the object of providing a simple and inexpensive method of the type stated at the outset with the avoidance of the disadvantages of the prior art, which method makes it possible to produce a cellular wheel with the required precision. A further aim of the invention is the provision of a method for producing a cellular wheel which is suitable for use in a pressure wave supercharger for supercharging internal combustion engines, in particular for supercharging small gasoline engines with an engine displacement in the order of magnitude of 1 liter or less. In particular, the method is to make the inexpensive production possible of dimensionally stable and highly precise cellular wheels with a cellular wall thickness of 0.5 mm or less.

It leads to the achievement according to the invention of the object that (a) a tool is placed onto the free end edges of the fins with a cylindrical inner circumferential face, the diameter of which corresponds to the internal diameter of the following sleeve, in order to fix the fins in their angular position, (c) a molding material mixture comprising a fire-resistant basic molding material and a binding agent which can be hardened and can be released from the molding basic material by thermal treatment is introduced into the cells which are delimited by the inner circumferential face of the tool and the fins, and is hardened, (d) after the removal of the tool, the following sleeve is placed onto the free end edges of the fins which are fixed in their angular position by the hardened molding material mixture, (e) the free end edges of the fins are joined to the following sleeve by welding or brazing to the cells, and (f) the hardened molding material mixture is treated thermally and the basic molding material is removed from the cells.

The sleeves and fins of the cellular wheel are preferably composed of a highly heat-resistant metallic material made from metal sheet, preferably with a thickness of less than 0.5 mm.

The cellular wheel which is produced by way of the method according to the invention is preferably used in a pressure wave supercharger for supercharging internal combustion engines, in particular gasoline engines with an engine displacement of 1 liter or less.

The production of sleeves with fins which project radially from them and are joined with an end edge to a sleeve can take place in different ways. The methods which are preferred in conjunction with the present invention are described in WO 2010/057319 A1.

The tool preferably has longitudinal grooves which emanate radially from the inner circumferential face and into which the free end faces of the fins which have an oversize are inserted before the introduction of the molding material mixture, and the oversize of the fins which projects out of the hardened molding material mixture after the removal of the tool is removed before the following sleeve is placed onto the free end edges of the fins. In one particularly preferred embodiment, the inner circumferential face of the tool can have bead-like elevations on both sides of the longitudinal grooves.

The fins are preferably joined to the sleeves by welding or brazing by means of a laser or electron beam.

The thermal treatment is preferably carried out only on the finished cellular wheel and the basic molding material is removed from all cells at the same time.

The finished cellular wheel is expediently subjected to stress-relief annealing, the hardened molding material mixture preferably being removed from the cells of the cellular wheel only after the stress-relief annealing.

For example, a core sand, in particular a quartz sand, can be used as fire-resistant basic molding material.

The binding agent is preferably an organic binding agent, in which the hardening reaction is accelerated by a gaseous catalyst or which is hardened by reaction with a gaseous hardener. In one particularly preferred embodiment of the method according to the invention, a two-component system with a solution of a polyol, in particular of a phenolic resin, as first component and with a solution of a polyisocyanate as second component is used as binding agent, and a gaseous tertiary amine, in particular triethylamine, is guided through the molding material mixture for hardening.

The essential core concept of the method according to the invention is the use of the core sand mixtures which are used during the casting of metals for providing a molding wall for the liquid metal to fix adjacent fins in their predefined angular position before the joining by the formation of a molding piece which can be introduced in a simple way between the fins and can be removed again.

Molding material mixtures which are suitable for use with the method according to the invention are essentially all core sand mixtures.

The fire-resistant basic molding material, for example quartz sand, is preferably present in a pourable form, with the result that it can be filled between the fins and can be compressed there. A firm cohesion between the particles of the basic molding material is produced by the binding agent, with the result that the molding piece which is formed is given the required mechanical stability.

Both organic and inorganic binding agents can be used. Binding agents are preferred here, the hardening of which can be carried out substantially at room temperature. Here, the hardening takes place usually by way of a chemical reaction which is triggered, for example, by virtue of the fact that a gas is guided as catalyst through the molding material mixture which is to be hardened and is filled and compressed between the fins.

Particularly preferred molding material mixtures contain organic binding agents, in which the hardening reaction is accelerated by a gaseous catalyst or which are hardened by reaction with a gaseous hardener. In the field of casting, these methods are called "cold box" methods.

A polyurethane binder is suitable, in particular, as binding agent for the use according to the invention, that is to say a two-component system with a first component consisting of the solution of a polyol, for example of a phenolic resin, and with a solution of a polyisocyanate as second component. A system of this type is known, for example, from U.S. Pat. No. 3,409,579 A. The two components of the polyurethane binder are brought to reaction by a gaseous tertiary amine being guided through the mixture of basic molding material and binding agent after the filling and compressing of the molding material mixture. The hardening reaction of polyurethane binders is a polyaddition, that is to say a reaction without separation of by-products, such as water.

During the heating of the hardened molding material mixture, the organic constituent parts of the binding agent break down. The basic molding material becomes pourable again, and can be removed from the cells by simple tilting of the finished cellular wheel.

The finished cellular wheel is preferably subjected to stress-relief annealing. It has proved particularly advantageous here if the hardened molding material mixture is removed from the cells of the cellular wheel only after the stress-relief annealing.

The customary materials in the field of casting for the production of cores can substantially be used as fire-resistant basic molding material. For example, quartz or zircon sand is suitable. Further suitable sands are, for example, olivine, chrome ore sand and vermiculite.

Furthermore, synthetic basic molding materials can also be used, such as hollow aluminosilicate spheres or spherical ceramic basic molding materials. Said spherical ceramic basic molding materials contain, for example, mullite, corundum, cristobalite in different proportions as minerals. They contain aluminum oxide and silicon dioxide as essential fractions. Typical compositions contain, for example, $Al_2O_3$ and $SiO_2$ in approximately identical proportions. In addition, further constituent parts can be contained, such as $TiO_2$, $Fe_2O_3$. The diameter of the spherical basic molding materials is preferably less than 1000 µm, in particular less than 600 µm. Synthetically produced fire-resistant basic molding materials, such as mullite, are also suitable. Said synthetic basic molding materials do not have a natural origin and can also have been subjected to a special shaping process, such as in the production of hollow aluminosilicate microspheres or spherical ceramic basic molding materials.

Glass materials can also be used as fire-resistant synthetic basic molding materials. They are used, in particular, either as glass spheres or as glass granulate. Customary glasses can be used as glass, glasses which have a high melting point being preferred. Glass beads and/or glass granulate which are/is produced from cullet are/is suitable. Borate glasses are likewise suitable.

The filling of the fin intermediate spaces with the molding material mixture preferably takes place by way of the methods which are used in the field of casting for core production. For example, the molding material mixture can be shot into the fin intermediate spaces by means of a core shooter with the aid of compressed air and can be compressed by means of a jogging device. The shot and compressed molding material mixture is subsequently hardened, for example by way of gassing. Said gassing is preferably carried out at room temperature. Here, the gassing duration lies in the order of magnitude of seconds.

BRIEF DESCRIPTION OF THE DRAWING

Further advantages, features and details of the invention result from the following description of preferred exemplary embodiments and using the drawing which serves merely for explanation and is not to be interpreted as being restrictive. In the drawing, in diagrammatic form.

DESCRIPTION OF PREFERRED EMBODIMENTS

A cellular wheel 10 (shown in FIGS. 1 and 2) of a pressure wave supercharger (not shown in the drawing) comprises a cylindrical inner sleeve 12 which lies concentrically with respect to a rotational axis y of the cellular wheel 10, a cylindrical outer sleeve 14 which lies concentrically with respect to the inner sleeve 12, and two intermediate sleeves 18, 20 which are arranged between the inner sleeve 12 and the outer sleeve 14 concentrically with respect to them. The inner annular space between the inner sleeve 12 and the first intermediate sleeve 18, the middle annular space between the first intermediate sleeve 18 and the second intermediate sleeve 20, and the outer annular space between the second intermediate sleeve 20 and the outer sleeve 14 are divided by strip-shaped fins 16 which lie radially with respect to the rotational axis y into a multiplicity of inner cells 22 and middle cells 24 which are arranged offset rotationally with respect to the former, and outer cells 26 which are once again arranged offset rotationally with respect to the former. The cellular wheel 10 which is shown by way of example with a diameter D and a length L of, for example, 100 mm has 36 inner cells 22, 54 middle cells 24 and 54 outer cells 26. The inner sleeve 12, the intermediate sleeves 18, 20, the outer sleeve 14 and the fins 16 have a uniform wall thickness of, for example, 0.4 mm and are composed of a highly heat-resistant metallic material, for example Inconel 2.4856. In the direction of the rotational axis y, said parts have an identical length L in accordance with the length of the cellular wheel 10 and extend between two end sides of the cellular wheel 10 which lie perpendicularly with respect to the rotational axis y.

Figure 1:
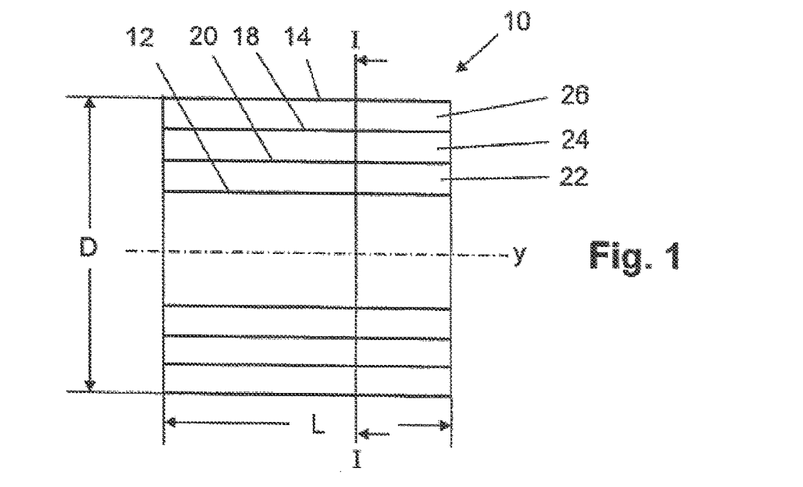
FIG. 1 shows a longitudinal section in the rotational axis through a cellular wheel for a pressure wave supercharger.
Figure 2:
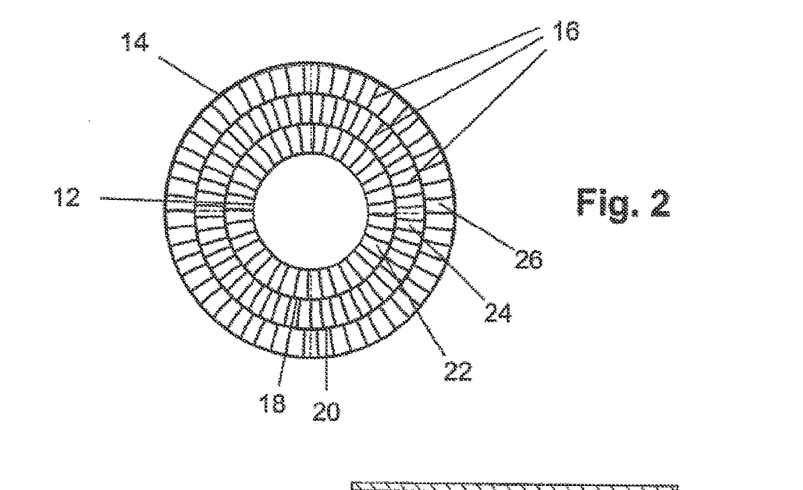
FIG. 2 shows a section perpendicularly with respect to the rotational axis of the cellular wheel from FIG. 1, according to the line I-I.
Figure 3:
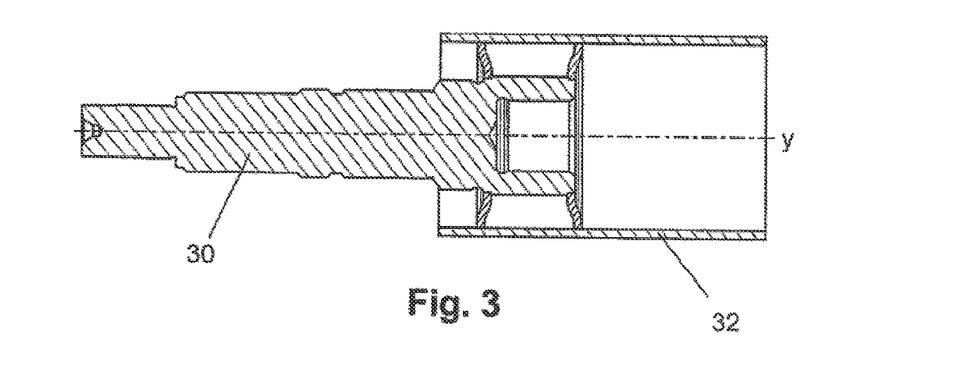
FIG. 3 shows a longitudinal section through a drive shaft having a flanged sleeve for the construction of the cellular wheel from FIG. 1.

A flanged sleeve 32 which is arranged concentrically with respect to the drive shaft 30 is seated on a drive shaft 30 (shown in FIG. 3) for a cellular wheel 10 which is shown in FIGS. 1 and 2. The rotational axis of the drive shaft 30 corresponds to the rotational axis y of a cellular wheel 10 which is placed on the drive shaft 30. In the following text, using FIGS. 4 to 13, the step-by-step construction of the cellular wheel 10 (shown in FIGS. 1 and 2) on the flanged sleeve 32 which is arranged on the drive shaft 30 will be explained in greater detail.

Figure 4:
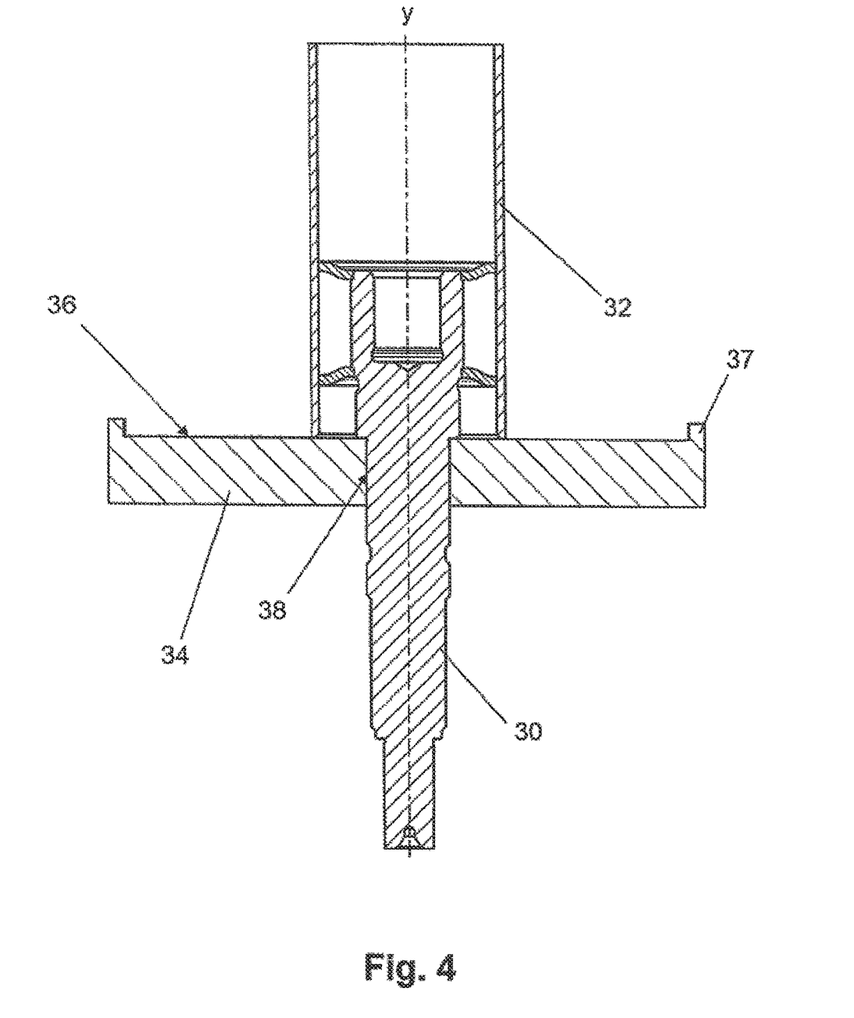
FIG. 4 shows a longitudinal section through the drive shaft, which is inserted into a receiving plate, with a flanged sleeve from FIG. 3.

As shown in FIG. 4, the drive shaft 30 with the flanged sleeve 32 arranged on it is inserted and fixed into a central hole 38 of a circular receiving plate 34 in such a way that the flanged sleeve 32 rests with its drive shaft-side end of a base face 36 over the entire end-side circumference, and the rotational axis y, corresponding to the rotational axis y of the cellular wheel 10, of the drive shaft 30 lies perpendicularly on the base face 36.

Figure 5:
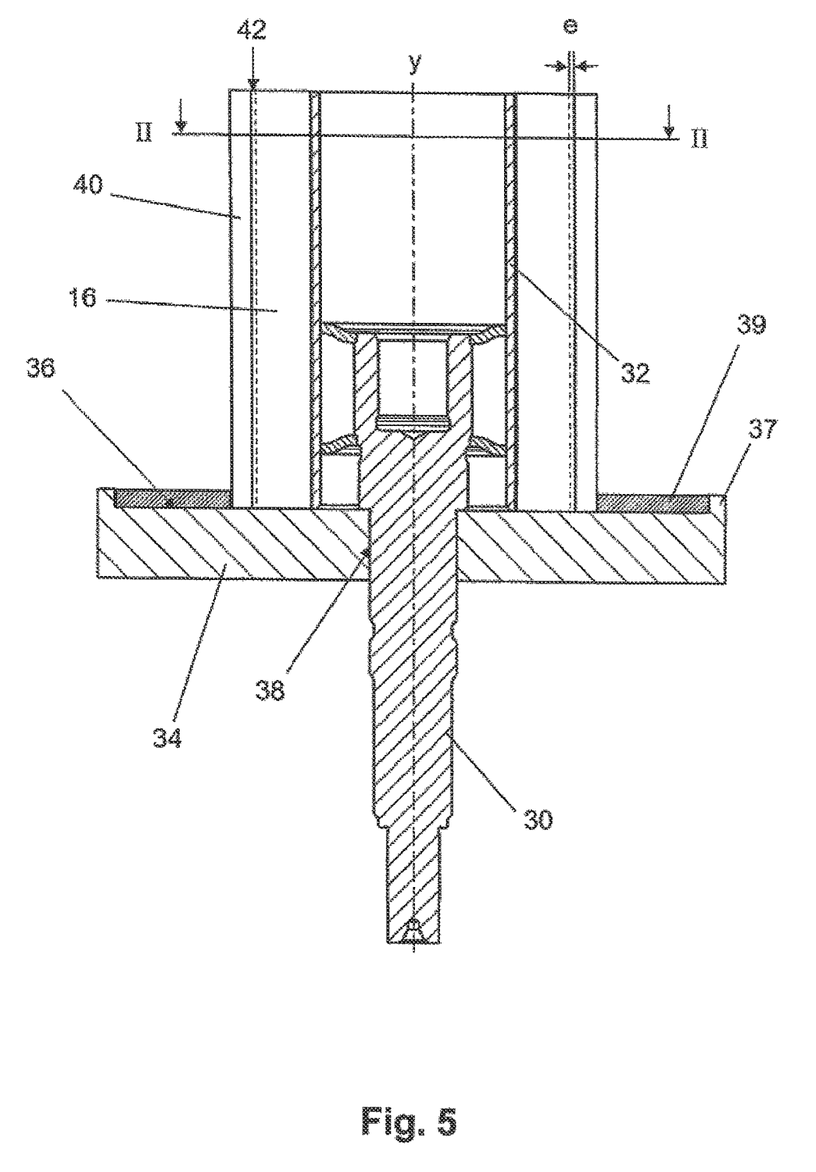
FIG. 5 shows the longitudinal section from FIG. 4 with the inner sleeve, which is placed onto the flanged sleeve and is fitted with fins, of the cellular wheel from FIG. 1 and with a first tool which is placed onto the fins.
Figure 6:
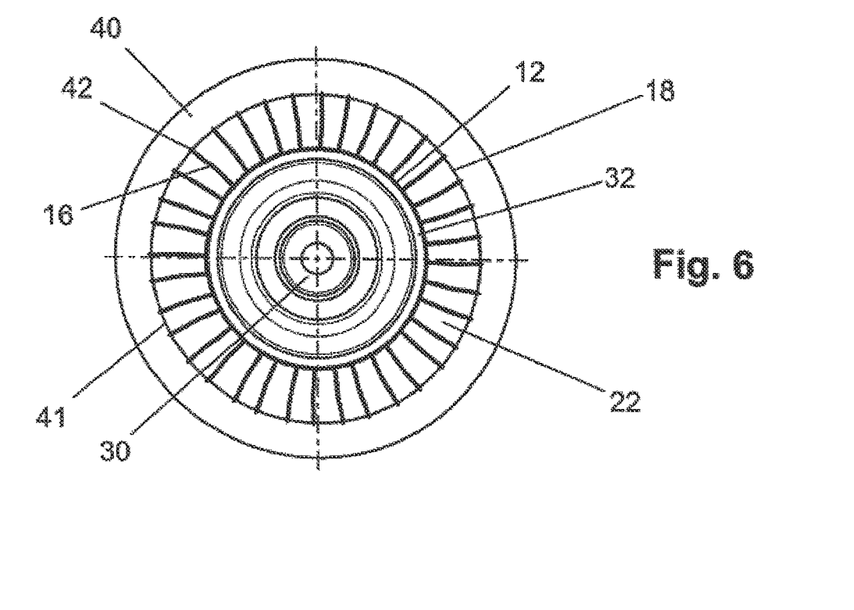
FIG. 6 shows a section through the arrangement from FIG. 5 according to the line II-II.

According to FIGS. 5 and 6, the inner sleeve 12, the internal diameter and length of which are adapted to the external diameter and the length of the flanged sleeve 32, is placed concentrically onto the flanged sleeve 32 with the fins 16 which were joined beforehand in a positionally accurate manner with an end edge to the inner sleeve 12, and projects with the free end edge radially to the outside, in the axial direction y until contact with the base face 36 of the receiving plate 34, and is welded to said flanged sleeve 32 by means of an NC-controlled laser beam.

A first tool 40 in the form of a hollow cylinder with a cylindrical inner circumferential face 41, the diameter of which corresponds to the internal diameter of the first intermediate sleeve 18, has longitudinal grooves 42 which are arranged in a positionally accurate manner, project radially from the inner circumferential face 41 into the first tool 40 and run parallel to the axial direction y. The first tool 40 is placed and fixed in a positionally accurate manner onto the base face 36 by means of a centering annular disk 39, the outer circumferential face of which bears against an annular edge 37 which projects coaxially with respect to the axial direction y or hole 38 from the base face 36 of the receiving plate 34 and the internal diameter of which corresponds to the external diameter of the first tool 40. Subsequently, the inner sleeve 12 which is fitted with the radially outwardly protruding fins 16 and has already been welded to the flanged sleeve 32 is introduced concentrically into the first tool 40 with the drive shaft 30 in the axial direction y until contact with the base face 36 of the receiving plate 34, by means of an introduction aid for the fins. Here, the fins 16 of the inner sleeve 12 which have an oversize e are guided in the longitudinal grooves 42 of the first tool 40.

Figure 7:
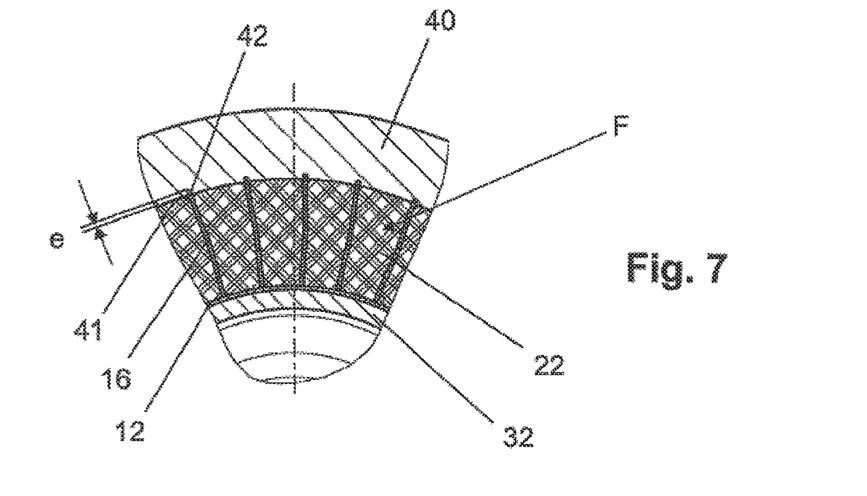
FIG. 7 shows an enlarged detail from FIG. 6 of the arrangement from FIG. 5 which is filled with core sand.

As shown in FIG. 7, the inner cells 22 which are delimited in a preliminary manner by the inner circumferential face 41 of the first tool 40 instead of the first intermediate sleeve 18 which is to be placed in a later step are filled with a molding material mixture F. After the compression, the molding material mixture F which fills the inner cells 22 completely is hardened.

A suitable molding material mixture is composed, for example, of a natural or synthetic basic molding material having a mean grain size of from 0.2 to 0.36 mm and an AFS number of from 52 to 45, for example quartz sand H32, with a binding agent on a polyurethane basis with trimethylamine as catalyst for the hardening process. The molding material mixture can be filled into the cells by way of a commercially available core shooter and can be compressed by way of a jogging device.

After the hardening of the molding material mixture F, the partially produced cellular wheel which is constructed on the flanged sleeve 32 is ejected together with the drive shaft 30 in the axial direction y out of the first tool 40, and the fins 16 of the inner sleeve 12 which project with the oversize e out of the hardened molding material mixture F are removed, for example by grinding, down to a dimension which corresponds to the internal diameter of the first intermediate sleeve 18. Since the fins are anchored firmly in the hardened molding material mixture, the removal of the oversize e can take place without problems by grinding.

The first intermediate sleeve 18 with the fins 16 which are joined to it on one side and project radially to the outside is placed in the axial direction y in a positionally accurate manner onto the free end edges of the fins 16 which are enclosed by the hardened molding material mixture F. Subsequently, the first intermediate sleeve 18 is welded by means of a laser beam to the free end edges of the fins 16 of the inner sleeve 12 which lie underneath, by means of a bead on plate weld, with the formation of the inner cells 22.

Figure 8:
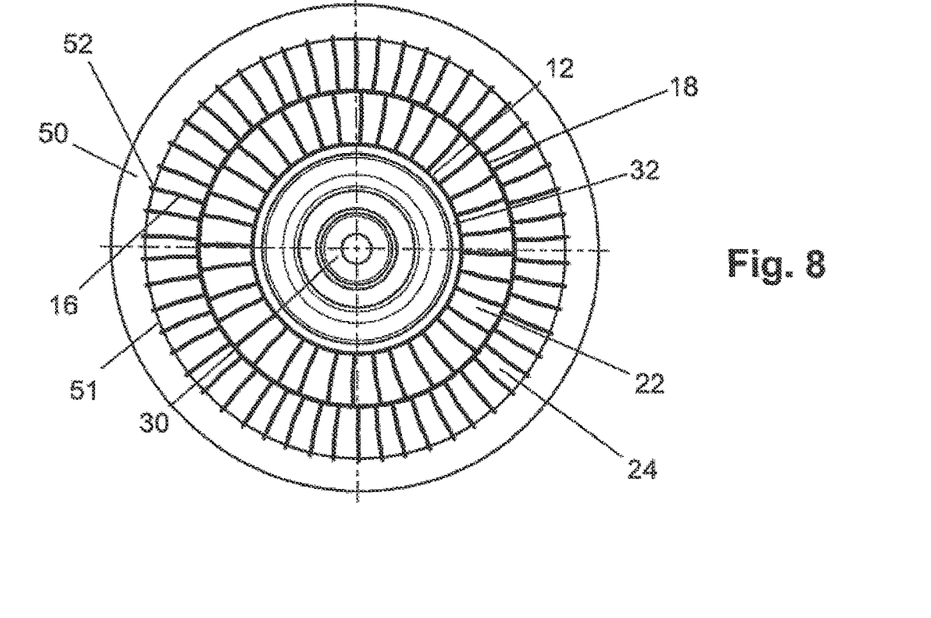
FIG. 8 shows the section from FIG. 6 through the arrangement from FIG. 5 with the first intermediate sleeve, which is placed onto the fins of the inner sleeve and is fitted with fins, of the cellular wheel from FIG. 1 and with a second tool which is placed onto the fins of the first intermediate sleeve.

A second tool 50 in the form of a hollow cylinder with a cylindrical inner circumferential face 51, the diameter of which corresponds to the internal diameter of the second intermediate sleeve 20, has longitudinal grooves 52 which are arranged in a positionally accurate manner, project radially from the inner circumferential face 51 into the second tool 50 and run parallel to the axial direction y. The second tool 50 is placed and fixed onto the base face 36 in a positionally accurate manner by means of a centering annular disk, the outer circumferential face of which bears against an annular edge 37 which projects coaxially with respect to the axial direction y from the base face 36 of the receiving plate 34 and the internal diameter of which corresponds to the external diameter of the second tool 50. Subsequently, the first intermediate sleeve 18 which is fitted with the radially outwardly projecting fins 16 and has already been welded to the fins 16 of the inner sleeve 12 is introduced concentrically into the second tool 50 with the drive shaft 30 in the axial direction y until contact with the base face 36 of the receiving plate 34, by means of an introduction aid for the fins. Here, the fins 16 of the first intermediate sleeve 18 which have an oversize e are guided in the longitudinal grooves 52 of the second tool 50 (FIG. 8).

Figure 9:
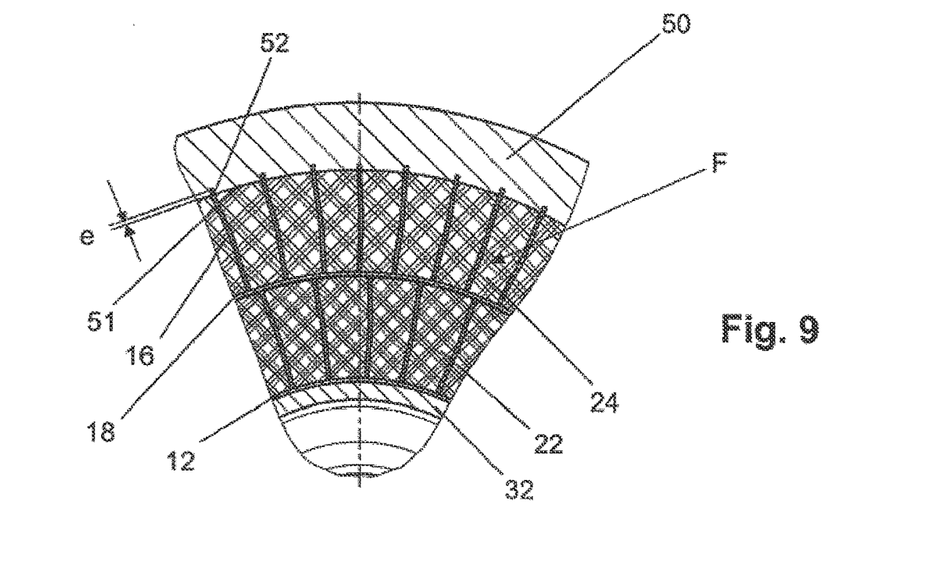
FIG. 9 shows an enlarged detail from FIG. 8, which corresponds to FIG. 7, of the arrangement which is filled further with core sand.

As shown in FIG. 9, the middle cells 24 which are delimited in a preliminary manner by the inner circumferential face 51 of the second tool 50 instead of the second intermediate sleeve 20 which is to be placed in a later step are filled with the molding material mixture F. After the compression, the molding material mixture F which fills the middle cells 24 completely is hardened.

After the hardening of the molding material mixture F, the partially produced cellular wheel which is constructed on the flanged sleeve 32 is ejected together with the drive shaft 30 in the axial direction y out of the second tool 50, and the fins 16 of the first intermediate sleeve 18 which project with the oversize e out of the hardened molding material mixture F are removed, for example by grinding, down to a dimension which corresponds to the internal diameter of the second intermediate sleeve 20.

The second intermediate sleeve 20 with the fins 16 which are joined to it on one side and project radially to the outside is placed in a positionally accurate manner in the axial direction y onto the free end edges of the fins 16, enclosed by the hardened molding material mixture F, of the first intermediate sleeve 18 middle cells 24. Subsequently, the second intermediate sleeve 20 is welded by means of a laser beam to the free end edges of the fins 16 of the first intermediate sleeve which lie underneath, by means of a bead on plate weld, with the formation of the middle cells 24.

Figure 10:
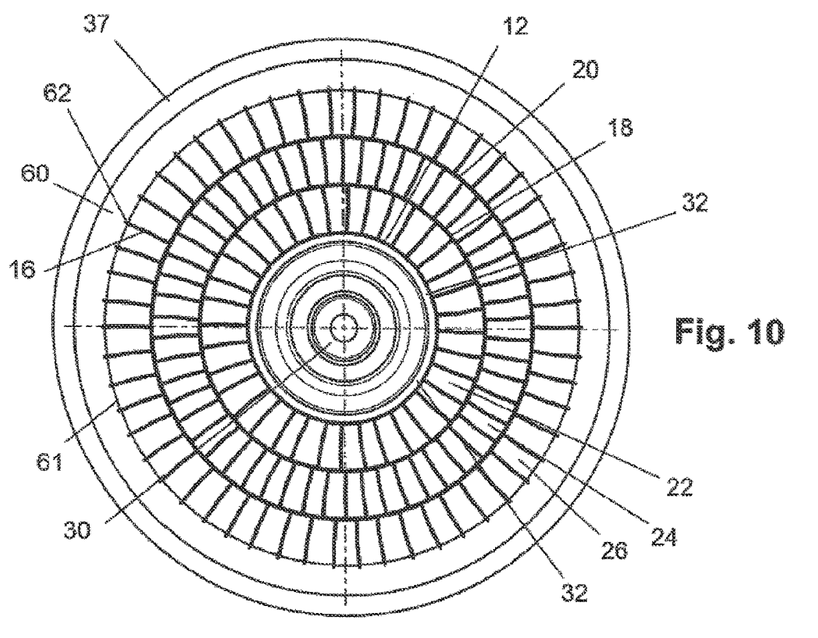
FIG. 10 shows the section from FIG. 8 through the arrangement from FIG. 5 with the second intermediate sleeve, which is placed onto the fins of the first intermediate sleeve and is fitted with fins, of the cellular wheel from FIG. 1 and with a second tool which is placed onto the fins of the second intermediate sleeve.

A third tool 60 in the form of a hollow cylinder with a cylindrical inner circumferential face 61, the diameter of which corresponds to the internal diameter of the outer sleeve 14, has longitudinal grooves 62 which are arranged in a positionally accurate manner, project radially from the inner circumferential face 61 into the third tool 60 and run parallel to the axial direction y. The third tool 60 is placed and fixed in a positionally accurate manner onto the base face 36. Here, the third tool 60 bears against the annular edge 37 which projects coaxially with respect to the axial direction y from the base face 36 of the receiving plate 34. Subsequently, the second intermediate sleeve 20 which is fitted with the radially outwardly projecting fins 16 and has already been welded to the fins 16 of the first intermediate sleeve 18 is introduced concentrically into the third tool 60 with the drive shaft 30 in the axial direction y until contact with the base face 36 of the receiving plate 34, by means of an introduction aid for the fins. Here, the fins 16 of the second intermediate sleeve 20 which have an oversize e are guided in the longitudinal grooves 62 of the third tool 60 (FIG. 10). The third tool 60 which is in contact with the base face 36 of the receiving plate 34 is centered in a positionally accurate manner by the peripheral annular edge 37 which is arranged concentrically with respect to the hole 38 and projects from the base face 36 of the receiving plate 34.

Figure 11:
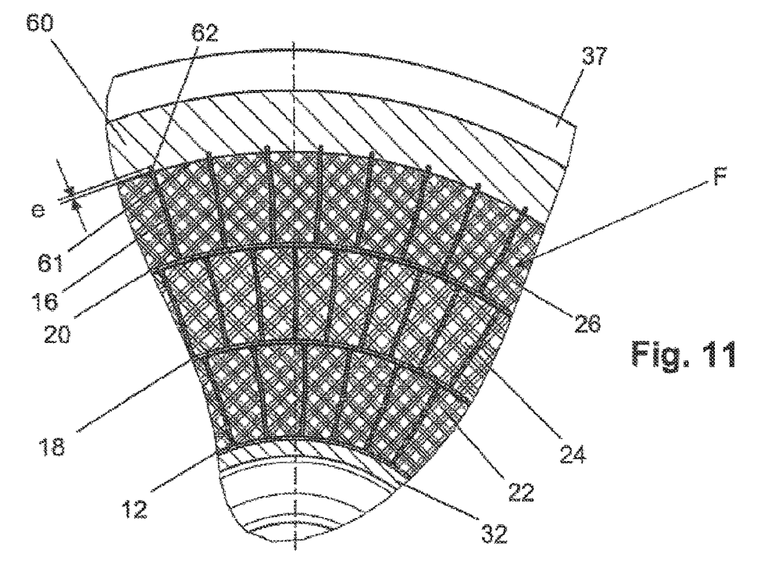
FIG. 11 shows an enlarged detail from FIG. 10, which corresponds to FIG. 9, of the arrangement which is filled further with core sand.
Figure 12:
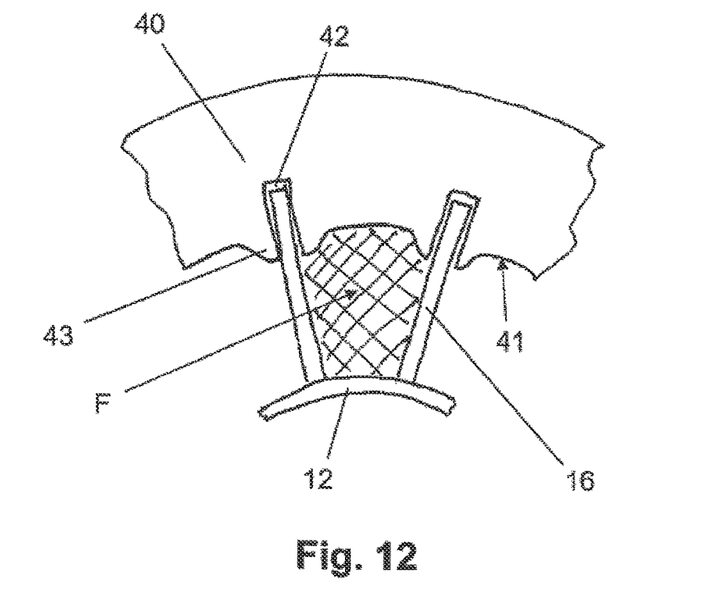
FIG. 12 shows a further enlarged detail from FIG. 11 with a tool variant.

As shown in FIG. 11, the outer cells 26 which are delimited in a preliminary manner by the inner circumferential face 61 of the third tool 60 instead of the outer sleeve 14 which is to be placed in a later step are filled with the molding material mixture F. After the compression, the molding material mixture F which fills the middle cells 26 completely is hardened.

After the hardening of the molding material mixture F, the partially produced cellular wheel which is constructed on the flanged sleeve 32 is ejected together with the drive shaft 30 in the axial direction y out of the third tool 60, and the fins 16 of the second intermediate sleeve 20 which project with the oversize e out of the molding material are removed, for example by means of grinding, down to a dimension which corresponds to the internal diameter of the outer sleeve 14.

The outer sleeve 14 is placed in the axial direction y onto the free end edges of the fins 16 of the second intermediate sleeve 20 which are enclosed by the hardened molding material mixture F. Subsequently, the outer sleeve 14 is welded by means of a laser beam to the free end edges of the fins 16 of the second intermediate sleeve 20 which lie underneath, by means of a bead on plate weld, with the formation of the outer cells 26.

The drive shaft 30 with the then finished cellular wheel 10, the cells 22, 24, 26 of which are still filled with the hardened molding material mixture F, is then subjected to stress-relief annealing at a temperature of, for example, 550° C. for three hours. During this thermal treatment, a thermal regeneration of the basic molding material takes place at the same time. Here, the binding agent decomposes and the basic molding material which is freed from the binding agent pours readily out of the cells 22, 24, 26.

During the stress-relief annealing, the inhomogeneous stress field which is produced during the joining of the end edges of the fins to the following sleeve merges into a state of equilibrium with a homogeneous stress field, with the result that, after the subsequent removal of the basic molding material from the cells, the cellular wheel is free of distortion and accordingly balancing can be dispensed with.

Figure 13:
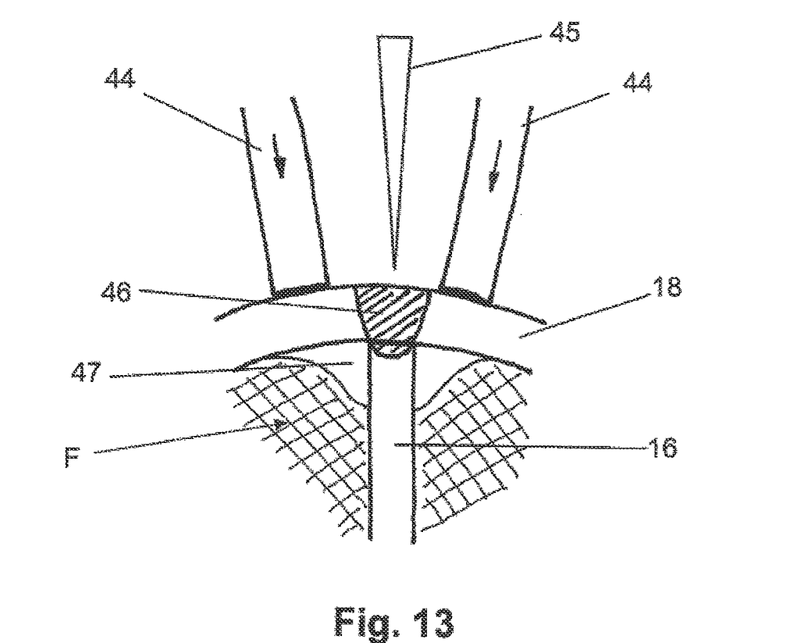
FIG. 13 shows an enlarged detail of the surroundings of a welding point in the case of the use of the tool variant from FIG. 12.

In the variant (shown in FIG. 12) of a first tool 40, bead-like elevations 43 which project from the inner circumferential face 41 and lead to correspondingly shaped depressions in the molding material mixture F which is filled and hardened between the fins 16 are arranged on both sides of the longitudinal grooves 42. As shown in FIG. 13, said depressions 43, after the first tool 40 is pulled off and the first intermediate sleeve 18 is pushed 40 onto the free end edges of the fins 16 which are shortened by the oversize e and project radially from the inner sleeve 12, lead to channels 47 which are arranged on both sides of the fins 16 and are open with respect to the intermediate sleeve 18 which rests thereon. If the first intermediate sleeve 18 is then welded by means of a laser beam 45 to the free end edges of the fins 16 of the inner sleeve 12 which lie underneath, by means of a bead on plate weld 46, the channels 47 make satisfactory pressing of the intermediate sleeve 18 via hold-downs 44 onto the free end edges of the fins 16 possible, and therefore optimum welding. A further advantage of the channels 47 is seen in the fact that an inert gas which is used to prevent the oxidation can be guided on a direct path to the contact faces of the intermediate sleeve 18 which are susceptible to oxidation with the free end edges of the fins 16.

It goes without saying that the variant (shown in FIGS. 12 and 13) of the first tool 40 can also be applied to the second and third tools 50, 60.

LIST OF DESIGNATIONS

10 Cellular wheel
12 Inner sleeve
14 Outer sleeve
16 Fins
18 First intermediate sleeve
20 Second intermediate sleeve
22 Inner cells
24 Middle cells
26 Outer cells
30 Drive shaft
32 Flanged sleeve
34 Receiving plate
36 Base face of 34
37 Annular edge on 34
38 Central hole in 34
39 Centering annular disk
40 First tool
41 Inner circumferential face of 40
42 Longitudinal grooves in 40
43 Bead-like elevations
44 Hold-down
45 Laser beam
46 Bead on plate weld
47 Channels
50 First tool
51 Inner circumferential face of 50
52 Longitudinal grooves in 40
60 First tool
61 Inner circumferential face of 60
62 Longitudinal grooves in 40
e Oversize of 16

The invention claimed is:

1. A method for producing a cellular wheel from metal, having sleeves which lie concentrically with respect to a rotational axis and fins, which are arranged between sleeves which follow one another, are oriented radially with respect to the rotational axis, are joined with an end edge to a sleeve, and are fixed in their angular position before the joining of the free end edges to a following sleeve,
wherein
   (a) placing a tool onto free end edges of the fins with a cylindrical inner circumferential face, the diameter of which corresponds to the internal diameter of the following sleeve, in order to fix the fins in their angular position,
   (b) introducing a molding material mixture comprising a fire-resistant basic molding material and a binding agent which can be hardened and can be released from the basic molding material by thermal treatment into cells, which are delimited by the inner circumferential face of the tool and the fins, and hardening said molding material mixture,
   (c) after the removal of the tool, placing the following sleeve onto the free end edges of the fins which are fixed in their angular position by the hardened molding material mixture,
   (d) joining the free end edges of the fins to the following sleeve by welding or brazing to the cells, and
   (e) thermally treating the hardened molding material mixture and removing the basic molding material from the cells,
   wherein the tool has longitudinal grooves which emanate radially from the inner circumferential face and into which the free end edges of the fins which have an oversize are inserted before the introduction of the molding material mixture, and
   wherein the oversize of the fins which projects out of the hardened molding material mixture after the removal of the tool is removed before the following sleeve is placed onto the free end edges of the fins.

2. The method as claimed in claim 1, wherein the inner circumferential face of the tool has bead-like elevations on both sides of the longitudinal grooves.

3. The method as claimed in claim 1, wherein the thermal treatment is carried out on the finished cellular wheel and the basic molding material is removed from all cells at the same time.

4. The method as claimed in claim 1, wherein the finished cellular wheel is subjected to stress-relief annealing.

5. The method as claimed in claim 4, wherein the hardened molding material mixture is removed from the cells of the cellular wheel after the stress-relief annealing.

6. The method as claimed in claim 1, wherein a core sand is used as fire-resistant basic molding material.

7. The method as claimed in claim 6, wherein said core sand is a quartz sand.

8. The method as claimed in claim 1, wherein the binding agent is an organic binding agent, in which the hardening reaction is accelerated by a gaseous catalyst or which is hardened by reaction with a gaseous hardener.

9. The method as claimed in claim 8, wherein a two-component system with a solution of a polyol first component and with a solution of a polyisocyanate as second component is used as binding agent, and a gaseous tertiary amine is guided through the molding material mixture for hardening.

10. The method as claimed in claim 9, wherein said polyol is an phenolic resin.

11. The method as claimed in claim 9, wherein said gaseous tertiary amine is triethylamine.

12. The method as claimed in claim 1, wherein the fins are joined to the sleeves by welding or brazing by means of a laser or electron beam.

13. The method as claimed in claim 1, wherein the sleeves and fins are composed of a highly heat-resistant metallic material made from metal sheet.

14. The method as claimed in claim 1, wherein the sleeves and fins are composed of a highly heat-resistant metallic material made from metal sheet with a thickness of less than 0.5 mm.

* * * * *